United States Patent [19]
Oswalt et al.

[11] Patent Number: 5,761,916
[45] Date of Patent: Jun. 9, 1998

[54] DISPLAY METHOD AND APPARATUS FOR LOAD AND CAPACITY FOR CHILLERS

[75] Inventors: Philip D. Oswalt, Indianapolis; Steven E. Wash, Greenwood; Ronald A. Wolfe, Indianapolis, all of Ind.

[73] Assignee: Advantage Engineering, Inc., Greenwood, Ind.

[21] Appl. No.: 664,443

[22] Filed: Jun. 21, 1996

[51] Int. Cl.⁶ .................................................. F25B 49/02
[52] U.S. Cl. ............................... 62/127; 62/130; 62/448
[58] Field of Search ........................... 62/125, 126, 127, 62/129, 130, 299, 448, 434, 435, 201, 185; 116/274; 340/610; 73/273, 861.77, 861.89

[56] References Cited

U.S. PATENT DOCUMENTS

| | | | |
|---|---|---|---|
| 2,683,224 | 7/1954 | Cole, Jr. | 73/861.77 X |
| 2,848,893 | 8/1958 | Tuffet et al. | 73/861.77 |
| 4,611,470 | 9/1986 | Enström | 62/127 |
| 5,083,438 | 1/1992 | McMullin | 62/127 X |
| 5,539,382 | 7/1996 | Duff et al. | 62/129 X |

FOREIGN PATENT DOCUMENTS 2506932  12/1982  France ................. 73/861.77

*Primary Examiner*—Harry B. Tanner
*Attorney, Agent, or Firm*—Woodard, Emhardt, Naughton Moriarty & McNett

[57] ABSTRACT

A portable, wheel-mounted, mechanically-refrigerated chiller for water used to cool a heat generating manufacturing process machine, has a process cooling water flow sensor assembly with conventional connections into the process water circulation portion of the chiller. The assembly includes a magnetically impregnated plastic vane operated by water flow through it, and a Hall-effect motion sensor responsive to vane operation to provide a signal to a computer. Water temperature to the process and from the process is monitored by sensors producing signals to the computer. The computer combines this information to produce a front panel digital read-out of the percent of capacity at which the chiller is operating or, upon selection, the refrigeration tonnage applied by the chiller to the process water.

17 Claims, 4 Drawing Sheets

DISPLAY METHOD AND APPARATUS FOR LOAD AND CAPACITY FOR CHILLERS

BACKGROUND OF THE INVENTION

1. Field of the Invention

This invention relates generally to water chillers, and more particularly to such chillers for industrial applications.

2. Description of the Prior Art

Industrial processes require controls. For continuous processes, automatic controls are preferred. Many processes use heat or generate heat during their use. To control temperature in such processes, water is often the most convenient heat exchange medium for removal of heat from the processing equipment, which could be plastic injection molding machinery, for example. In some instances, community water supplies provide an adequate source of cooling water. But in many instances, available water supplies are neither stable enough in temperature, adequate in volume, or satisfactory in chemical composition. In such situations, portable chillers may be used. These are wheel-mounted machines including a reservoir for water to be used in the process equipment to be cooled, suitable fittings for connection to the cooling water lines of the processing equipment, a pump for moving the cooling water through the equipment, and mechanical refrigeration apparatus for cooling the water in the reservoir. The refrigeration equipment may employ ambient air with appropriate blower and heat exchanger for the refrigerant condenser, or it may use a water cooled condenser. Such chillers are manufactured and sold by Advantage Engineering, Inc. of Greenwood, Ind., U.S.A.

Portable chillers as described above, can be used with different types of processing equipment, and moved from one to another conveniently. Different equipment units have different heat dissipation requirements. Also, any given processing machine can have different heat dissipation requirements depending upon the nature of the work and the rate of usage. Portable chillers provide a very convenient way to deal with the heat dissipation needs in industry. But, because such chillers are so convenient, and because there is often a need to expedite production, increase volume, and minimize cost, there can be a tendency to operate equipment at or above capacity. Because of the versatility of portable chillers, they are sometimes subjected to cooling loads substantially greater or less than their design specifications. But the user has no convenient way to determine this, and some users are simply unable to predict that their portable chiller will be operating at substantially less than capacity or, conversely, overloaded. In some instances, the user might not even recognize the condition during operations. The present invention is addressed to the need for users of portable chillers to be aware of the loading on their chillers.

SUMMARY OF THE INVENTION

Described briefly, according to a typical embodiment of the present invention, a portable chiller is provided with a water flow sensor assembly provided in the process water circulation portion of the chiller. The assembly includes a vane operated by water flow through it, and a motion sensor responsive to vane operation to provide a signal to a computer. Water temperature to the process and from the process are monitored by sensors producing signals to the computer. The computer combines this information to produce at a front panel display, a digital read-out of the percent of capacity which the chiller is operating or, upon selection, the refrigeration tonnage applied by the chiller to the process water. It also produces a digital read-out of process water flow-rate expressed in gallons-per-minute (gpm).

DESCRIPTION OF THE PREFERRED EMBODIMENT

Figure 1:
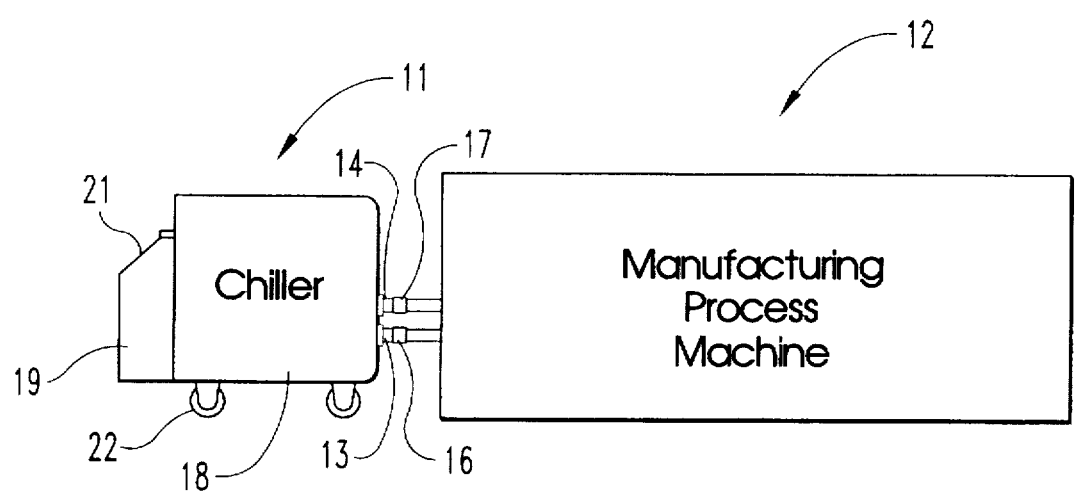
FIG. 1 is a schematic diagram of a portable chiller applied to a manufacturing machine, and incorporating the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

FIG. 1 shows a portable chiller 11 according to the present invention, connected to a manufacturing process machine 12 which can be, for example, an injection molding machine. The chiller has two valves 13 and 14 to which plumbing from the process can be connected at quick-connect fittings 16 and 17. The process cooling water is delivered from the chiller through valve 13 and coupler 16 to the machine 12. The heated water is returned from the machine 12 through the return plumbing and coupler 17 and valve 14 to the chiller. The chiller has refrigeration and heat exchange equipment in the cabinet 18, a computer and related controls in cabinet 19 and display panel 21 on the front of cabinet 19. The entire chiller assembly is supported on wheels 22 for portability so that it can be readily disconnected from machine 12 at the couplings 16 and 17, and moved on to serve another machine.

Figure 2:
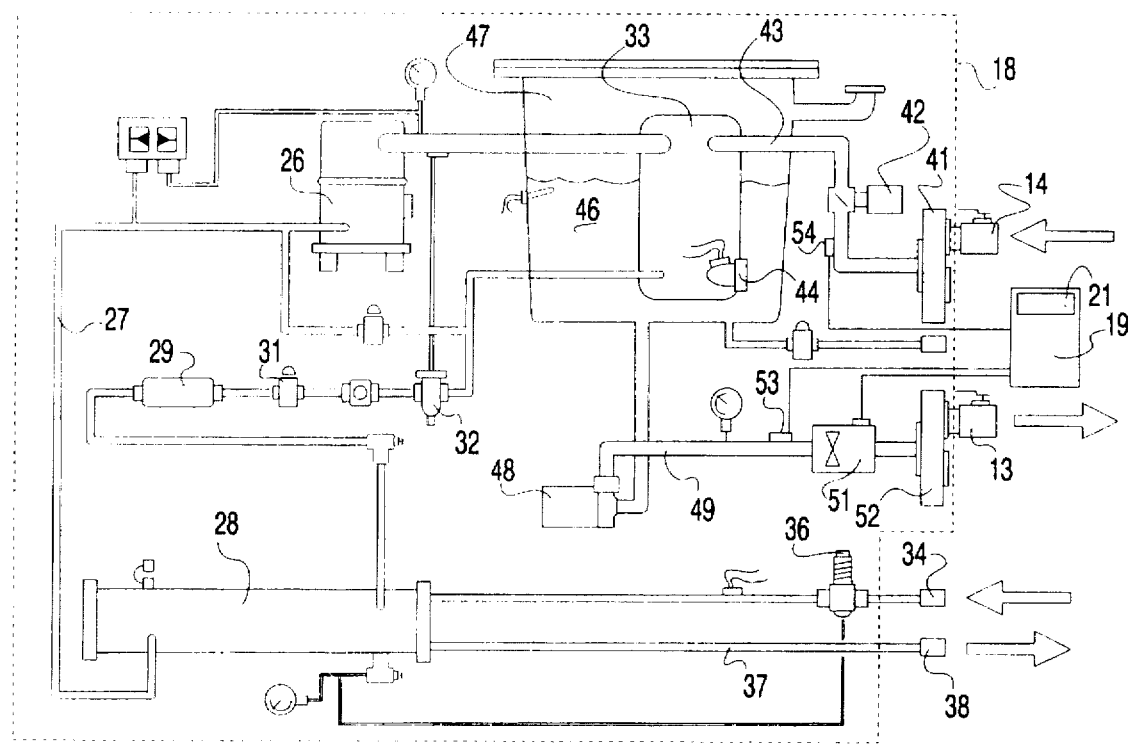
FIG. 2 is a more specific schematic diagram of the chiller assembly itself with the present invention therein.

Referring now to FIG. 2, the chiller apparatus contained in the cabinet 18 of FIG. 1 is shown along with the control cabinet and display panel which are shown in a much smaller scale for convenience.

The refrigeration circuit can be considered conventional, so will be described only briefly. It includes compressor 26 pushing refrigerant through line 27 to the water cooled condenser 28, filter/dryer 29, liquid line solenoid valve 31 to expansion valve 32, from which gas is delivered to the refrigerant evaporator 33 from which it is returned to compressor 26. Water from a city water supply or other suitably pressurized supply is provided to the inlet fitting 34 from which it can be delivered through the water regulator valve 36 to the condenser an then returned through line 37 to fitting 38 for connection to a drain.

For cooling the manufacturing process water returned through valve 14, the water enters through the valve 14 to manifold 41, low-flow safety switch 42 and enters the refrigerant evaporator heat exchanger at 43. It leaves the heat exchanger through the outlet 44 and mixes with the process water 46 in reservoir 47.

A centrifugal pump 48 has its suction side receiving process water from the reservoir 47 and delivers it through the piping 49 and flow sensor assembly 51 of the present invention to manifold 52 from which it exits through valve 13 to the process machine. A sensor 53 is mounted on the pipe 49 for the temperature of the water being delivered to the process. Temperature sensor 54 is provided for the temperature of the water returning from the process. Both of these sensors, as well as the flow sensor assembly 51, deliver signals to the computer in cabinet 19. Information from other sensors is also delivered to the computer, as are signal lines from the computer to the refrigeration equipment, but are already incorporated in commercial machinery marketed by the aforementioned Advantage Engineering, Inc., so it is not necessary to describe those features here.

Figure 3:
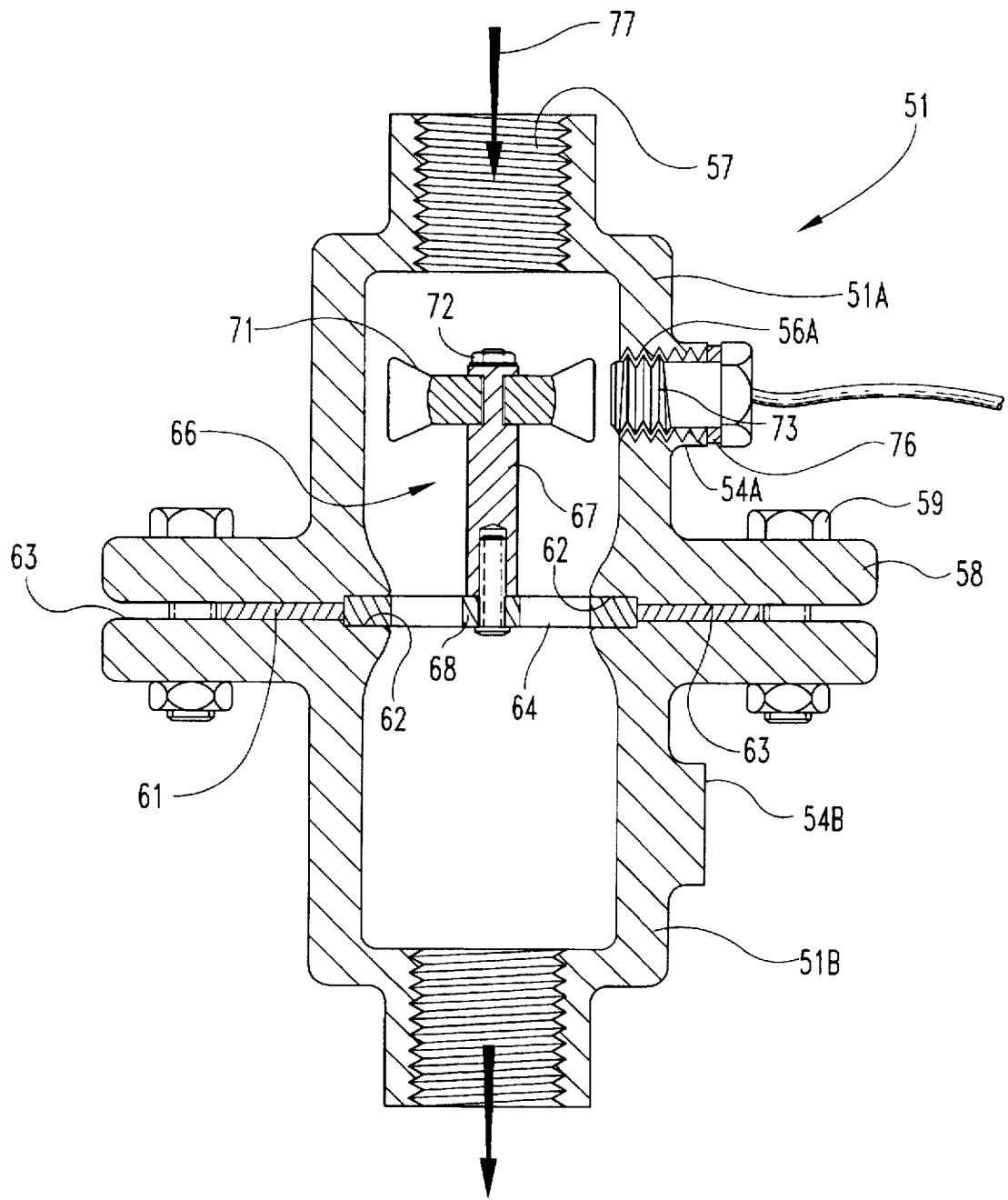
FIG. 3 is an axial sectional view of the process water flow sensor assembly which is incorporated in the chiller according to the invention.

Referring now to FIG. 3, the flow sensor assembly 51 is shown. It includes two fittings 51A and 51B and which are identical except that fitting 51A has boss 54A which has a machine threaded hole 56A in the wall thereof, whereas fitting 51B has only the boss 54B but without a hole in it. Each of the fittings is provided with pipe threaded aperture such as 57 at one end, and bolt flange 58 at the other. They are fastened together with four bolts 59 with a paper seal gasket 61 between the flange faces. Each of the fittings has a circular recessed shelf 62 in the bolt flange face 63. These receive the mounting ring 64 of a flow responsive vane assembly 66. The vane assembly includes a mounting post 67 which is fastened to the cross bar 68 of the mounting ring 64 by means of a screw or rivet 69. At the upper end of the post 67, a vane unit 71 is mounted to freely rotate on the post and is retained by a nut 72 threaded onto the top of the post 67. In the illustrated example, the vane wheel 71 includes four vanes which are made of a plastic material impregnated with a ferro-magnetic material. A magnetic or Hall-effect pick-up sensor 73 is screwed into threads 74 in the wall of the fitting 52 and sealed by a gasket 76. This type of rotary vane and pick-up assembly is made by the Xolox Corporation of Fort Wayne, Ind., U.S.A.

The mounting ring 64 is secured snugly in place in the circular recesses 62 in each of the two fittings 52 and 53 and permits free-flow of water in pipe 49 (FIG. 2) in the direction of arrow 77 through the vane and out the fitting 51B.

Figure 4:
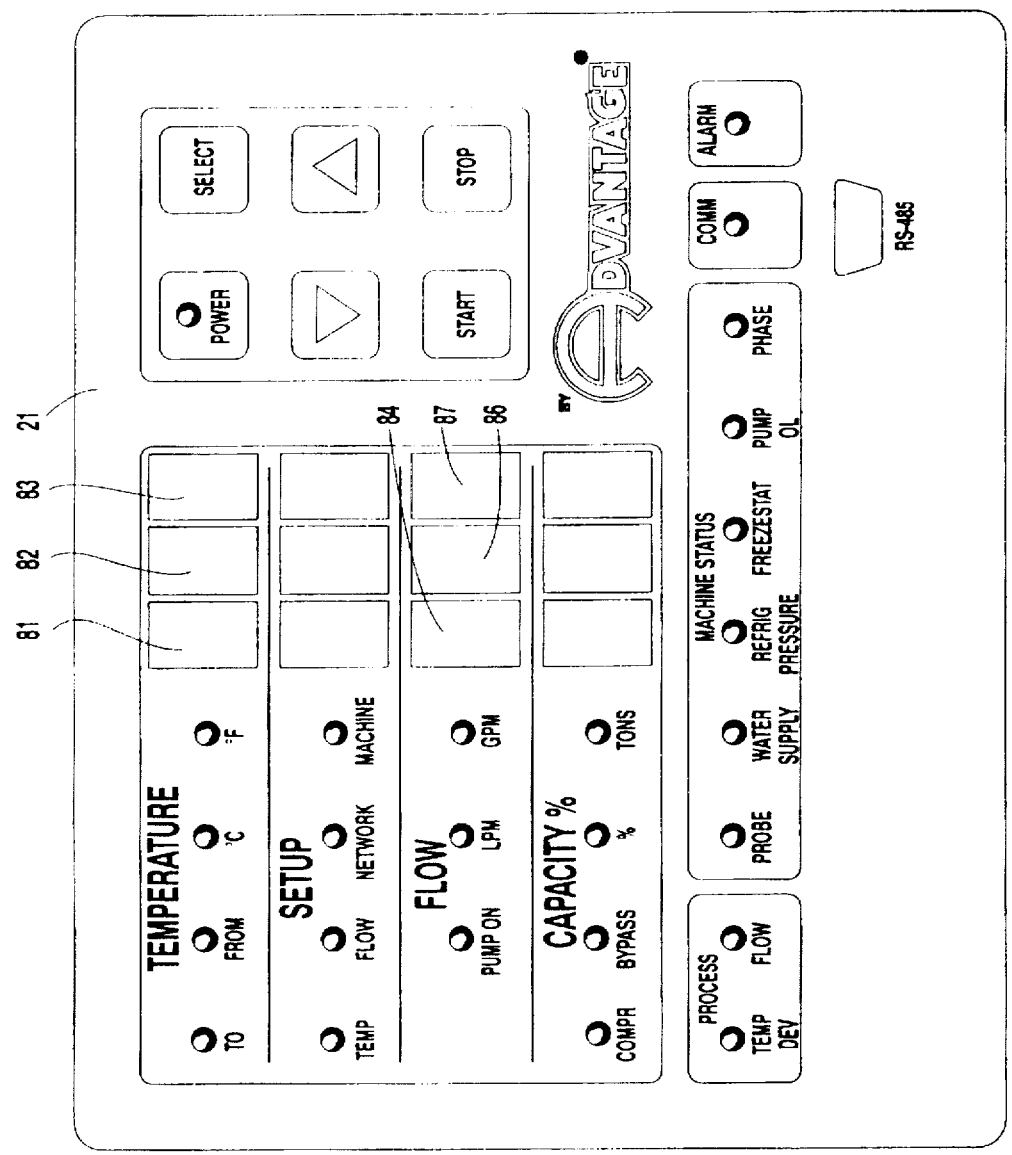
FIG. 4 is an enlarged view of the display panel of the chiller assembly.

Referring now to FIG. 4, those features of the display pertinent to the present invention are shown. In addition to the legends shown there, windows 81, 82 and 83 provide a digital feed-out of the temperature in the measurement system at the location indicated by the illuminated light, those systems and locations being determined by the sequential operation of the selected pad switch and the up or down arrow pad switch for each element. The "TO PROCESS" and "FROM PROCESS" temperatures are those sensed by the sensors 53 and 54, respectively (FIG. 2) for the set point established by the operator. In the flow rate display, one light indicates that the pump 48 is on and the other two lamps are illuminated alternatively, depending upon whether the selection is to produce the read out in windows 84, 86 and 87 in liters per minute or gallons per minute.

In the percent capacity display, the read out is in percentages. However, an alternative choice is in refrigeration tonnage applied to the process water. In the status display, illumination or absence of illumination of the respective lamps indicates the condition of various features in the system.

It should be understood that the present invention can be applied as well to air cooled chillers as to the water cooled chiller of the type illustrated in FIG. 2.

Pressure gages and other features such as illustrated symbolically in FIG. 2, are available on the machine as on chillers currently manufactured and marketed by the above-mentioned Advantage Engineering, Inc. In those machines, the low-flow safety switch 42 is responsive to a low flow of water from the process and which, by itself, can provide a signal to the controller to alert the operator to potential freezing of the evaporator. There is also an evaporator temperature sensor at the water outlet from the refrigerant evaporator to shut-off the compressor if necessary to avoid freezing of the evaporator. The present invention may eliminate the need for the low-flow safety switch item while, at the same time, providing the needed signal to the controller for a low-flow alert by the alarm light on the panel of FIG. 4 and by a sounder or other means, if desired.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A chiller apparatus comprising:

a refrigeration circuit having a refrigerant evaporator;

a coolant reservoir associated with the evaporator for transfer of heat from coolant in the reservoir to the evaporator;

an outlet for connection to a machine external to the chiller to supply coolant to the machine;

an inlet for coolant return from the machine;

plumbing for conducting coolant from the inlet to the reservoir and for conducting coolant from the reservoir to the outlet;

a coolant flow responder in the plumbing;

a computer; and a display device coupled to the computer and coupled through the computer to the responder and responsive to flow of coolant to provide a real-time active display of coolant flow measurement.

2. The apparatus of claim 1 and further comprising:

a first temperature sensor associated with the coolant inlet and coupled to the computer and providing a coolant inlet temperature signal to the computer;

a second temperature sensor associated with the coolant outlet and coupled to the computer and providing a coolant outlet temperature signal to the computer;

the computer being arranged to produce a display in tonnage of refrigeration applied to the coolant in the chiller.

3. The apparatus of claim 2 and wherein:

the computer is arranged to produce a display in percent of refrigeration capacity of the chiller.

4. The apparatus of claim 1 and wherein:

the responder includes a vane mounted in the path of flow of coolant through the plumbing.

5. The apparatus of claim 4 and wherein the responder includes:

a sensor operably associated with the vane and responsive to passage of a portion of the vane to produce a signal to the computer.

6. The apparatus of claim 4 and wherein the responder includes:

first and second fittings upstream and downstream, respectively, in series conducting flow of the coolant, the vane being located in the first fitting.

7. The apparatus of claim 6 and wherein:

the fittings have flanged ends fastened together.

each fitting having a threaded opening remote from the flanged end and receiving piping in the coolant conducting plumbing.

8. The apparatus of claim 7 and wherein:

there is a circular recess in each flanged end;

there is a circular ring clamped in the recesses;

there is a post mounted to the ring; and the vane is rotatably mounted to the post.

9. The apparatus of claim 7 and wherein:

the first fitting has a wall with a boss having a threaded hole therein; and the responder further includes a Hall effect device received in the hole and responding to passage of the vane to produce a signal to the computer.

10. The apparatus of claim 9 and wherein:

the second fitting is identical to the first fitting except that the second fitting omits the threaded hole in the boss.

11. The apparatus of claim 8 and wherein:

there is a circular seal between the flanged ends outboard of the circular ring and contacting each flanged end.

12. The apparatus of claim 11 and wherein:

fasteners are mounted to the flanged ends to fasten them together.

13. The apparatus of claim 12 and wherein:

the fasteners are bolts pulling the flanged ends toward each other and into tight sealing engagement with the seal.

14. The apparatus of claim 12 and wherein:

the fasteners clamp the circular ring in the recesses between the fittings.

15. A molding machine process coolant temperature control apparatus comprising:

a heat exchanger for cooling the process coolant;

a coolant reservoir associated with the heat exchanger for transfer of heat from coolant in the reservoir to the heat exchanger;

an outlet connected to a molding machine external to the reservoir and supplying coolant to the machine;

an inlet connected to the machine and receiving coolant returned from the machine;

plumbing for conducting coolant from the inlet to the reservoir and for conducting coolant from the reservoir to the outlet;

a first temperature sensor for sensing temperature of coolant flowing to the outlet;

a second temperature sensor for sensing temperature of coolant flowing from the inlet toward the reservoir;

a coolant flowmeter in the plumbing;

a computer coupled to the flowmeter; and a display device coupled to the computer and displaying real-time coolant flow rate.

16. The apparatus of claim 15 and wherein:

the heat exchanger is a refrigerant evaporator in a refrigeration circuit;

the temperature sensors are coupled to the computer; and the computer is arranged to produce a display in tonnage of refrigeration applied to the coolant in the reservoir.

17. The apparatus of claim 15 and wherein:

the heat exchange is a refrigerant evaporator in a refrigeration circuit; and the computer is arranged to produce a display in percent of refrigeration capacity of the chiller refrigeration circuit.

* * * * *

UNITED STATES PATENT AND TRADEMARK OFFICE
CERTIFICATE OF CORRECTION

PATENT NO  :  5,761,916
DATED      :  June 9, 1998
INVENTOR(S):  Philip D. Oswalt; Steven E. Wash; Ronald A. Wolfe It is certified that error appears in the above-identified patent and that said Letters Patent is hereby corrected as shown below:

Column 1, line 11, change "beat" to --heat--.

Column 2, line 58, change "an" to --and--.

Column 6, line 33, delete the word "chiller".

Signed and Sealed this

Third Day of November, 1998

Attest:

BRUCE LEHMAN

Attesting Officer

Commissioner of Patents and Trademarks